(12) United States Patent
Sako

(10) Patent No.: US 10,286,991 B2
(45) Date of Patent: May 14, 2019

(54) FUEL CELL WATERCRAFT

(71) Applicant: Suzuki Motor Corporation, Shizuoka-ken (JP)

(72) Inventor: Kota Sako, Shizouka-ken (JP)

(73) Assignee: Suzuki Motor Corporation (JP)

( * ) Notice: Subject to any disclaimer, the term of this patent is extended or adjusted under 35 U.S.C. 154(b) by 40 days.

(21) Appl. No.: 15/783,035

(22) Filed: Oct. 13, 2017

(65) Prior Publication Data

US 2018/0155000 A1 Jun. 7, 2018

(30) Foreign Application Priority Data

Dec. 5, 2016 (JP) .................... 2016-235932

(51) Int. Cl.
| | | |
|---|---|---|
| *B63H 21/17* | (2006.01) | |
| *B60R 25/042* | (2013.01) | |
| *B63H 20/00* | (2006.01) | |
| *B63H 21/00* | (2006.01) | |

(52) U.S. Cl.
CPC ............ *B63H 21/17* (2013.01); *B60R 25/042* (2013.01); *B63H 20/00* (2013.01); *B63H 2021/003* (2013.01); *Y02T 70/5209* (2013.01); *Y02T 90/38* (2013.01); *Y02T 90/46* (2013.01)

(58) Field of Classification Search
CPC .......... B63H 21/17; Y02T 90/46; Y02T 90/38
See application file for complete search history.

(56) References Cited

U.S. PATENT DOCUMENTS

| 6,793,027 B1 | 9/2004 | Yamada et al. |
|---|---|---|
| 2006/0009092 A1 | 1/2006 | Krietzman |
| 2006/0040573 A1 | 2/2006 | Kobayashi et al. |
| 2007/0138006 A1 | 6/2007 | Oakes et al. |
| 2010/0266911 A1* | 10/2010 | Aso ................... H01M 8/04179 429/427 |
| 2010/0304228 A1 | 12/2010 | Majarov et al. |
| 2011/0048308 A1 | 3/2011 | Tarkovacs |
| 2011/0233996 A1 | 9/2011 | Kato et al. |
| 2013/0244125 A1* | 9/2013 | Wake ................ H01M 8/04097 429/415 |

(Continued)

FOREIGN PATENT DOCUMENTS

| JP | 2015196407 A | 11/2015 |
|---|---|---|
| JP | 2015196408 A | 11/2015 |

OTHER PUBLICATIONS

U.S. Appl. No. 15/783,154, filed Oct. 13, 2017.

*Primary Examiner* — Stewart A Fraser
(74) *Attorney, Agent, or Firm* — Lerner, David, Littenberg, Krumholz & Mentlik, LLP

(57) ABSTRACT

A fuel cell watercraft (1) includes an electric outboard motor (6); a fuel cell unit (2) adapted to supply electric power to the electric outboard motor; a hydrogen fuel tank (3) adapted to supply hydrogen fuel to the fuel cell unit; and a storage space (10) adapted to house the fuel cell unit and the hydrogen fuel tank, wherein the fuel cell watercraft is configured such that a relief valve (30) is installed on the hydrogen fuel tank, the storage space includes a hatch (11*c*) used to introduce the fuel cell unit and the hydrogen fuel tank, a lid member (11*b*) used to tightly close the hatch, and means (11*a*) for detecting unauthorized opening of the lid member, and when the unauthorized opening is detected, the relief valve is opened.

5 Claims, 2 Drawing Sheets

(56) References Cited

U.S. PATENT DOCUMENTS

| | | | |
|---|---|---|---|
| 2014/0322623 A1* | 10/2014 | Ohgami | H01M 8/04753 |
| | | | 429/427 |
| 2015/0111116 A1* | 4/2015 | Hotta | H01M 8/04097 |
| | | | 429/415 |
| 2018/0154996 A1* | 6/2018 | Sako | H01M 8/04201 |

* cited by examiner

FUEL CELL WATERCRAFT

TECHNICAL FIELD

The present invention relates to a fuel cell watercraft equipped with an anti-theft function.

BACKGROUND ART

Fuel cells have been considered for use as a power supply for an electric outboard motor. For example, Patent Literature 1 discloses a fuel cell watercraft in which a fuel tank and battery are placed inside a hull while a fuel cell, electric motor, and propeller are placed outside the hull.

CITATION LIST

Patent Literature

[Patent Literature 1] JP 2015-196408 A

DISCLOSURE OF THE INVENTION

Problem to be Solved by the Invention

However, the fuel cell (power generator) is larger than an electric motor commonly mounted on an outboard motor, and has to be connected with the fuel tank in the hull as well via piping used to supply hydrogen fuel, and thus, this layout cannot be said to be practical. In addition, regarding small watercraft, there is also concern about a problem of theft; however, Patent Literature 1 does not disclose measures against theft.

The present invention has been made in view of the above problem with the conventional technique and has an object to provide a fuel cell watercraft equipped with an anti-theft function.

Means for Solving the Problem

To solve the above problem, a fuel cell watercraft (1) according to the present invention comprises:

an electric outboard motor (6); a fuel cell unit (2) adapted to supply electric power to the electric outboard motor; a hydrogen fuel tank (3) adapted to supply hydrogen fuel to the fuel cell unit; and a storage space (10) adapted to house the fuel cell unit and the hydrogen fuel tank, wherein the fuel cell watercraft is configured such that a relief valve (30) is installed on the hydrogen fuel tank, the storage space includes a hatch (11c) used to introduce the fuel cell unit and the hydrogen fuel tank, a lid member (11b) used to tightly close the hatch, and means (11a) for detecting unauthorized opening of the lid member, and when the unauthorized opening is detected, the relief valve is opened and hydrogen is discharged actively from the hydrogen fuel tank.

Advantages of the Invention

With the above configuration, the fuel cell watercraft according to the present invention is advantageous in draining fuel quickly to prevent theft by discharging hydrogen actively from the hydrogen fuel tank when the lid member of the storage space adapted to house the fuel cell unit and hydrogen fuel tank is opened without authorization.

MODE FOR CARRYING OUT THE INVENTION

An embodiment of the present invention will be described in detail below with reference to the accompanying drawings.

Figure 1:
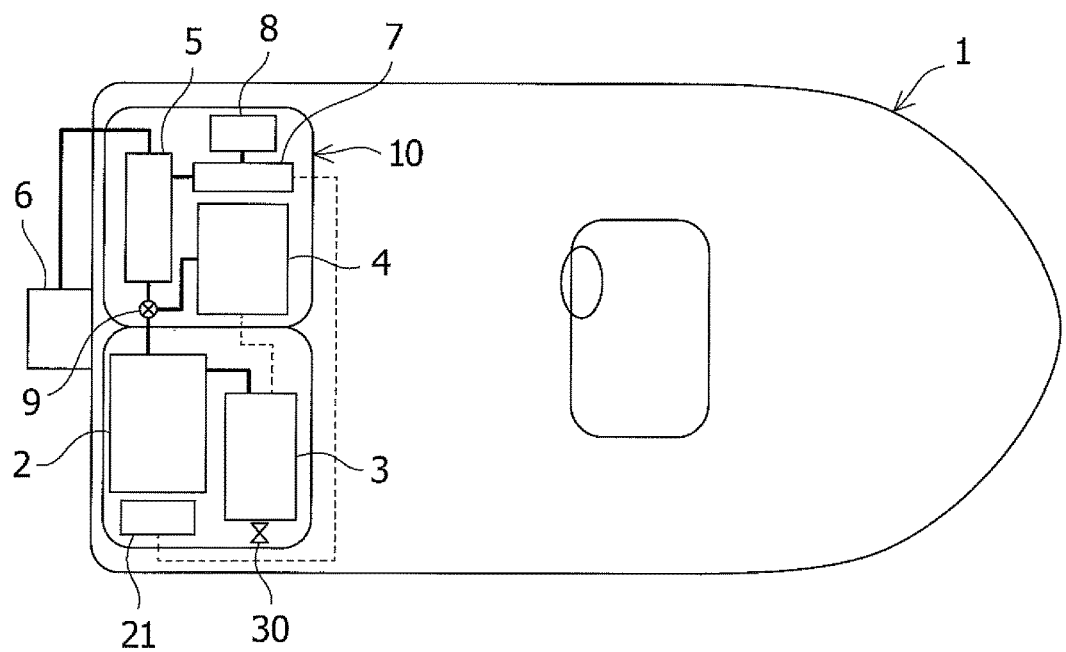
FIG. 1 is a plan view showing a fuel cell watercraft according to an embodiment of the present invention.
Figure 2:
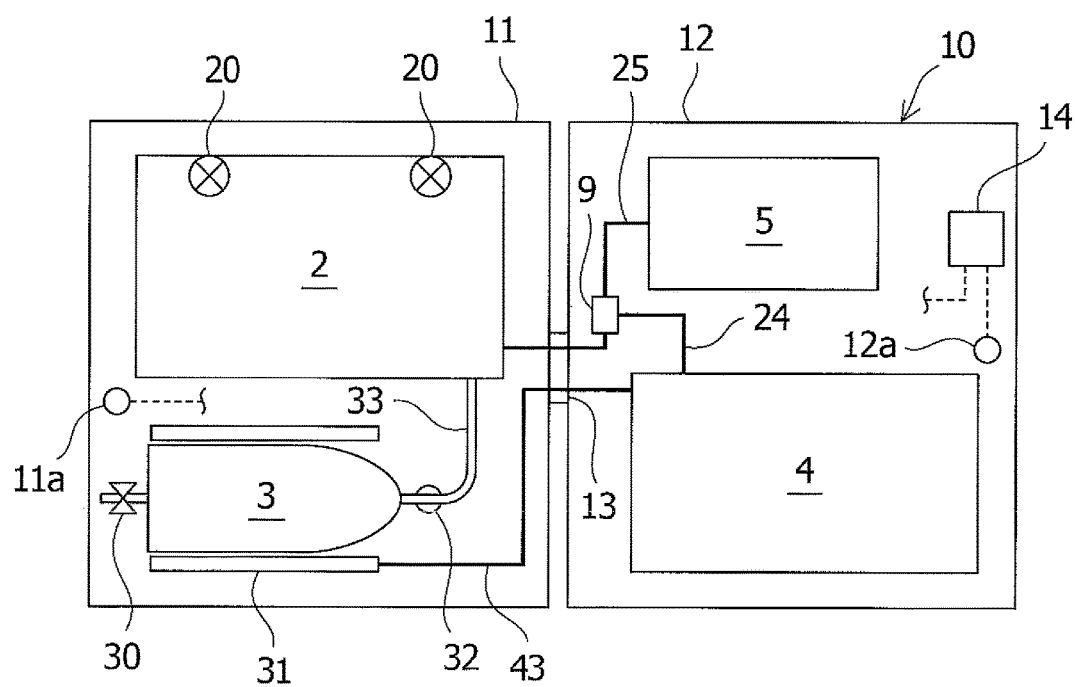
FIG. 2 is a plan view of a principal part showing storage spaces of the fuel cell watercraft according to the embodiment of the present invention.
Figure 3:
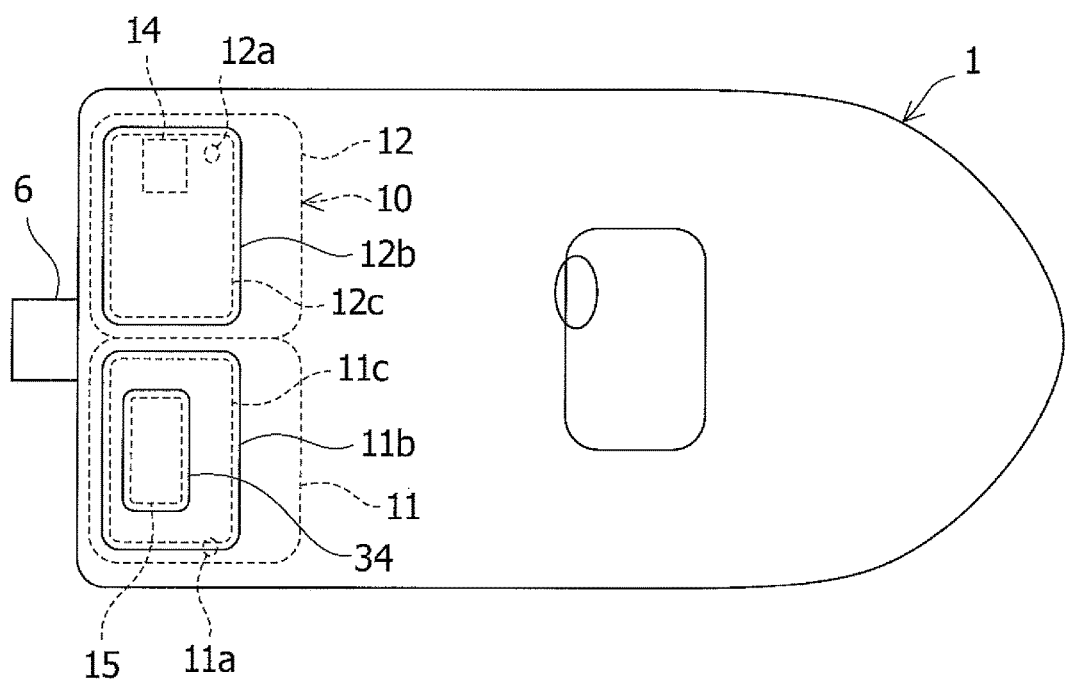
FIG. 3 is a plan view showing a fuel cell watercraft according to an embodiment of the present invention.

Referring to FIGS. 1 to 3, a fuel cell watercraft 1 according to an embodiment of the present invention includes an electric outboard motor 6 adapted to produce propulsion, a fuel cell unit 2 which is a power generator adapted to supply electric power to the electric outboard motor 6, a hydrogen fuel tank 3 adapted to supply hydrogen fuel to the fuel cell unit 2, a secondary battery 4, a converter 5, a step-down converter 7, a low-voltage secondary battery 8, a power management device 9, and a control device 14, all of which, except for the electric outboard motor 6, are housed in a storage space 10 in the hull.

The fuel cell unit 2 includes a fuel-cell stack in which a large number of cells each made up of a fuel electrode and air electrode placed across an electrolyte membrane are stacked via separators defining flow paths adapted to supply fuel (hydrogen) and an oxidizer (atmospheric oxygen) to the cells as well as a fuel-side header, an air-side header, a compressor (not illustrated), a controller 21, and the like, and is provided with a cooling fan 20.

The hydrogen fuel tank 3 can be a high-pressure hydrogen tank or low-pressure hydrogen tank adapted to store hydrogen directly as gas, but preferably is a hydrogen storing alloy tank containing a hydrogen storing alloy capable of storing and releasing hydrogen in a molecular state inside a container. The metal species of the storing alloy is not particularly limited, but preferably is one that is able to release hydrogen at as low a temperature as possible and at as low a pressure as possible.

A supply pipe 33 adapted to supply hydrogen fuel to the fuel cell unit 2 is connected to one end of the hydrogen fuel tank 3, and a relief valve 30 for use to discharge hydrogen in an emergency is installed at another end, but another layout may be used.

A heater 31 is installed around the hydrogen fuel tank 3 to facilitate hydrogen release from the storing alloy in the tank by heating. As the heater 31, a resistance heating element or electric heater adapted to generate heat by the passage of electric current is used preferably.

The secondary battery 4 is installed to enable stable driving of the electric outboard motor 6 by being charged beforehand with electricity generated by the fuel cell unit 2 and feeding electricity form the secondary battery 4 to a motor of the electric outboard motor 6 and thereby make up for characteristics of the fuel cell unit 2 in which power generation capacity falls at startup; and a lithium ion battery (LIB) or the like is preferable.

The converter 5 is an HVDC/DC converter used to adjust voltages of the fuel cell unit 2 and the secondary battery 4. The present embodiment uses a step-down type adapted to step down an output voltage (approximately 100 V) of the fuel cell unit 2 to the voltage (48 V) of the secondary battery 4 and stably supply electric power from the secondary battery 4 to the electric outboard motor 6 as described above, but when high output is required, a step-up type adapted to supply the voltage of the fuel cell unit 2 or secondary battery 4 to the electric outboard motor 6 by converting the voltage into a high voltage may be used.

The step-down converter 7 is a 12-V DC/DC converter used to convert part of the electric power of the fuel cell unit 2 and secondary battery 4 into a low voltage and the resulting electric power is accumulated in the low-voltage secondary battery 8 (12-V battery) and supplied to auxiliary equipment including a compressor (blower), a solenoid valve, a cooling fan, and the controller 21 attached to the fuel cell unit 2 as well as supplied to the power management device 9 and the control device 14.

In the illustrated example, the storage space 10 is made up of two storage spaces 11 and 12 installed side by side in rear part of the hull, where the first storage space 11 on a right side of the hull houses the fuel cell unit 2 and the hydrogen fuel tank 3 while the second storage space 12 on a left side of the hull houses the secondary battery 4, the converter 5, the step-down converter 7, the low-voltage secondary battery 8, the power management device 9, and the control device 14. Note that existing storage spaces (deck storages) provided in the hull can be utilized as the first and second storage spaces 11 and 12 or there may be a case in which either one or both are provided separately from the existing storage spaces.

An output side of the fuel cell unit 2 is connected to an input side of the converter 5 via the power management device 9 through wiring 25 inserted into a communicating portion 13 in the center while input/output of the secondary battery 4 is designed to be connected selectively to the output side of fuel cell unit 2 (during charging) or the input side of the converter 5 (during discharging) via the power management device 9 through wiring 24.

Also, the heater 31 of the hydrogen fuel tank 3 is connected to the secondary battery 4 via wiring 43 inserted through the communicating portion 13 in the center and designed to be supplied with electric power from the secondary battery 4. Note that preferably the communicating portion 13 is sealed by a sealing material or the like after routing of the wiring 25, 43, and the like.

The storage spaces 11 and 12 are equipped with lid members 11b and 12b (hatch covers) used to tightly close hatches 11c and 12c in a deck on the hull, and sensors 11a and 12a adapted to detect unauthorized opening of the lid members 11b and 12b are installed in the respective storage spaces 11 and 12.

The sensors 11a and 12a are, for example, pressure sensors adapted to detect pressure changes in the storage spaces 11 and 12 when the lid members 11b and 12b are opened without authorization while the fuel cell watercraft 1 is in harbor, but may be switches adapted to detect opening degrees of the lid members 11b and 12b or sensors adapted to detect vibration resulting from unauthorized opening of the lid members 11b and 12b. Also, a sensor adapted to detect oxygen concentration in the first storage space 11 may be used as the sensor 11a in the first storage space 11. In this case, usually the oxygen concentration increases gradually from a state of low oxygen concentration just after operation to a level equal to atmospheric pressure, and thus, any sudden change in oxygen concentration is estimated to indicate unauthorized opening.

In the above cases, preferably the control device 14 is configured to turn on when an open state of the lid member 11b or 12b is detected by a sensor or switch. Also, in either case, preferably the control device 14 is configured not to be turned off by just a reset operation of a sensor or switch once turned on. Also, by installing a locking mechanism on the lid members 11b and 12b, the sensor or switch may be configured to be activated by a locking operation. Such a configuration makes it possible to prevent theft in case in which a key to the locking mechanism is obtained without authorization.

Note that the first storage space 11 is provided with an intake and exhaust unit 15 which combines an intake unit adapted to introduce air for use to cool the fuel cell unit 2 and for use in reaction and an exhaust unit for use to discharge air after cooling and steam discharged from the fuel cell unit 2. The intake and exhaust unit 15 is equipped with a salt-resistant filter as a measure against salt damage as well as with a sub-hatch cover 34 in order for the intake and exhaust unit 15 to be tightly closed when not in use. Note that the intake unit and exhaust unit may be installed separately.

In the fuel cell watercraft 1 configured as described above, the control device 14 and the sensors 11a and 12a become operational when the fuel cell watercraft 1 is not in use, and thereby enable the anti-theft function.

In this state, if the lid members 11b and 12b (or sub-hatch cover 34 of the intake and exhaust unit 15) are opened, i.e., opened without authorization, a detection signal from the sensor 11a or 12a is sent to the control device 14, which then breaks the wiring 25 using a breaker incorporated in the power management device 9 to disable electric power from being fed from the fuel cell unit 2 and the secondary battery 4 to the side of the converter 5 (electric outboard motor 6).

However, if the wiring 25 is simply broken, electric power might be fed from either of the fuel cell unit 2 and the secondary battery 4 to the electric outboard motor 6 via direct coupling or the like, and thus, the control device 14 further implements anti-theft measures (i) to (iii) below.

(i) Opens the relief valve 30 of the hydrogen fuel tank 3 while feeding electric power from the secondary battery 4 to the heater 31 via the wiring 43. As the hydrogen fuel tank 3 is heated, hydrogen release from a hydrogen storing alloy is facilitated, causing hydrogen to be released through the relief valve 30.

(ii) Starts the fuel cell unit 2 and causes hydrogen fuel remaining in the hydrogen fuel tank 3 to be consumed also by the fuel cell unit 2. In so doing, electric power generated by the fuel cell unit 2 is used to charge the secondary battery 4 via the power management device 9 and electric wiring 24, and the electric power of the secondary battery 4 is also consumed by feeding the electric power from the secondary battery 4 to the heater 31.

(iii) Ensures that the cooling fan 20 will be started by the electric power fed from the secondary battery 4, that hydrogen fuel discharged from the hydrogen fuel tank 3 through the relief valve 30 will diffuse into outside air, and that operation of the cooling fan 20 will facilitate power consumption of the secondary battery 4.

When anti-theft measures such as described above are implemented, even if electric power can be fed from either of the fuel cell unit 2 and the secondary battery 4 to the side of the electric outboard motor 6 via direct coupling or the like, the hydrogen fuel in the hydrogen fuel tank 3 and electric power of the secondary battery 4 are drained while an operation of direct coupling or the like is taking time, which disables the fuel cell watercraft 1 from navigating and thereby makes it possible to prevent theft.

Note that of anti-theft measures (i) to (iii) above, the control device 1 may be configured to implement only (i) above while shutting off hydrogen fuel supply to the fuel cell unit 2 using a shut-off valve 32. Furthermore, with this configuration, anti-theft measures (ii) to (iii) above may be configured to be implemented if an unauthorized-access history is reset or the fuel cell unit 2 is started by means of direct-coupled piping or the like after the shut-off valve 32 comes into operation. Also, in addition to (iii) above, power consumption of the secondary battery 4 may be configured to be facilitated by turning on a lamp of the fuel cell watercraft 1 with electric power being fed from the secondary battery 4.

Although it is assumed in the above embodiment that hatch covers which can be opened and closed using a hinge or slider are used as the lid members 11b and 12b, various lid members are available for use, including lid members which can be opened and closed by being attached and detached using fastening means such as a screw or using tightening means such as a clamp, and moreover, use or parallel use of lid members other than rigid lid members such as lid members made of flexible sheet material is not precluded, and in that case, a fastener which can be opened and closed is provided between peripheral edges of the lid members and edges of the hatches.

Whereas some embodiments of the present invention have been described above, the present invention is not limited to these embodiments, and various modifications and changes can be made based on the technical idea of the present invention.

REFERENCE SIGNS LIST

1 Fuel cell watercraft
2 Fuel cell unit
3 Hydrogen fuel tank
4 Secondary battery (lithium ion battery)
5 Converter (HVDC/DC converter)
6 Electric outboard motor
7 Step-down converter (12-V DC/DC converter)
8 Secondary battery (12-V battery)
9 Power management device (breaker)
10 Storage space
11 First storage space
11a, 12a Sensor
11b, 12b Lid member (hatch cover)
12 Second storage space
13 Communicating portion
14 Control device
15 Intake and exhaust unit
20 Cooling fan
30 Relief valve
31 Heater
34 Sub-hatch cover

The invention claimed is:

1. A fuel cell watercraft comprising:
an electric outboard motor;
a fuel cell unit adapted to supply electric power to the electric outboard motor;
a hydrogen fuel tank adapted to supply hydrogen fuel to the fuel cell unit; and
a storage space adapted to house the fuel cell unit and the hydrogen fuel tank,
wherein the fuel cell watercraft is configured such that a relief valve is installed on the hydrogen fuel tank, the storage space includes a hatch used to introduce the fuel cell unit and the hydrogen fuel tank, a lid member used to tightly close the hatch, and means for detecting unauthorized opening of the lid member, and when the unauthorized opening is detected, the relief valve is opened and hydrogen is discharged actively from the hydrogen fuel tank.

2. The fuel cell watercraft according to claim 1, wherein the fuel cell watercraft is configured such that the hydrogen fuel tank is a hydrogen storing alloy tank provided with a heater; and when the unauthorized opening is detected, electric power is fed to the heater from the fuel cell unit and hydrogen consumption is facilitated through hydrogen release from the hydrogen storing alloy tank and power generation of the fuel cell unit.

3. The fuel cell watercraft according to claim 1, wherein the fuel cell watercraft is configured such that the fuel cell unit is equipped with a fan; and when the unauthorized opening is detected, the fan is started and hydrogen discharged through the relief valve is diffused by the fan.

4. The fuel cell watercraft according to claim 3, wherein the fuel cell watercraft is configured such that when the unauthorized opening is detected, electric power is fed to the fan from the fuel cell unit and hydrogen consumption is facilitated through power generation of the fuel cell unit.

5. The fuel cell watercraft according to claim 1, further comprising a secondary battery as an auxiliary power supply for the fuel cell unit; and
means for cutting off power supply from the secondary battery to the electric outboard motor when the unauthorized opening is detected.

* * * * *